United States Patent [19]

Suzuki et al.

[11] Patent Number: 4,871,894
[45] Date of Patent: Oct. 3, 1989

[54] METHODS AND APPARATUS FOR MANUFACTURING PISTON RODS

[75] Inventors: Masaomi Suzuki, Tokyo; Hiroyasu Koizumi, Kanagawa, both of Japan

[73] Assignee: Nihon Radiator Co., Ltd., Tokyo, Japan

[21] Appl. No.: 85,969

[22] Filed: Aug. 14, 1987

[30] Foreign Application Priority Data

| Aug. 25, 1986 | [JP] | Japan | 61-198856 |
| Jan. 14, 1987 | [JP] | Japan | 62-7186 |
| Jan. 14, 1987 | [JP] | Japan | 62-7187 |
| Jan. 14, 1987 | [JP] | Japan | 62-3979[U] |

[51] Int. Cl.⁴ ............................................. B23K 9/28
[52] U.S. Cl. ................................. 219/93; 219/78.01; 219/91.2
[58] Field of Search .............. 219/78.01, 78.15, 119, 219/93, 98, 91.2, 91.23

[56] References Cited

U.S. PATENT DOCUMENTS 3,975,611  8/1976  Gordon .............................. 219/98
4,609,805  9/1986  Tobita et al. ...................... 219/78.15

Primary Examiner—C. L. Albritton
Assistant Examiner—Lincoln Donovan
Attorney, Agent, or Firm—Kalish & Gilster

[57] ABSTRACT

A method for producing a piston rod for securing a ball to each end of a rod through projection welding which comprises detachably retaining the ball to be secured in a ball holder for presenting the proximate rod end to the ball; the ball holder being constructed of electrically conductive material to provide a first electrode, with the rod holder being constructed of electrically conductive metal to provide a second electrode. The ball holder and rod holder are adapted for relative travel toward each other to effect a mutual zone of ball and rod contact. Electric current is then passed through the first and second electrodes for projection welding of the ball and rod through the zone of contact while the same are in an inert gas atmosphere. Then the now welded contact is cooled; and thereafter a second electric current is passed therethrough to temper the weld. Apparatus useful for effecting such method is provided having suction means for retaining the ball during performance of the method; there being further provided a stopper element for limiting the relative travel of the ball holder and rod holder toward each other.

20 Claims, 14 Drawing Sheets

METHODS AND APPARATUS FOR MANUFACTURING PISTON RODS

BACKGROUND OF THE INVENTION

1. Field of the Invention

The present invention relates in general to methods and apparatus for manufacturing piston rods, and, more particularly, to a method for welding a ball to the end surface of a rod through friction or projection, as well as to apparatus useful for effecting such method.

2. Description of the Prior Art

Generally, a piston rod with a ball welded to both ends of the rod through friction is accomplished by use of a variable capacity compressor as disclosed, for example, in Japanese Patent Publication No. 23390/1986.

Prior art piston rods of such type are disclosed in Japanese Patent Laid-Open No. 124815/1983 and manufacturing methods therefor are shown in Japanese Patent Laid-Open No. 54346/1973 and Japanese Patent Laid-Open No. 128522/1983.

FIGS. 17 to 26, inclusive of the drawing of this application are presented to reveal graphically prior art pistons of such type, whereby a more comprehensive view may be obtained of the background for the present invention with the attributes thereof becoming all the more apparent. Thus, with reference to FIG. 17, the piston rod depicted comprises a rod 1 constructed of, for example, S20CD steel, having welded at each of its ends, through friction, a ball 2, as of SUJ2 steel.

Figure 17:
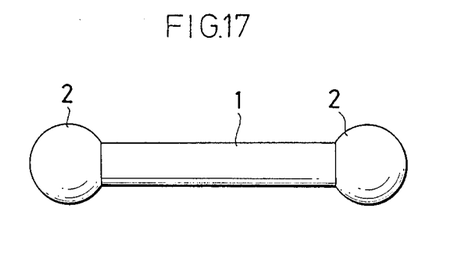
FIG. 17 is a side view showing a piston rod manufactured by a conventional method.
Figure 18:
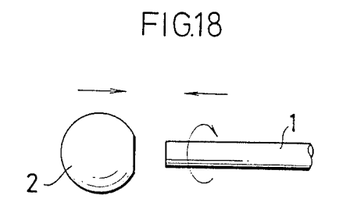
FIG. 18 is a schematic drawing showing a rod and ball as addressed pursuant to a conventional piston rod manufacturing method.
Figure 19:
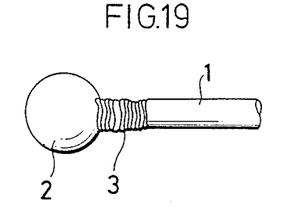
FIG. 19 is a fragmentary side view showing a piston rod having an oxide formed on the weld zone thereof by a conventional manufacturing method.

FIG. 18 schematically illustrates a conventional method for producing the piston rod, shown in FIG. 17., wherein each ball 2 and the rod 1 are subjected to friction welding by butting the rod 1 against each ball 2 as the rod is rotated at high speed. However, by friction welding of each ball 2 to the rod 1 is performed under atmospheric conditions an oxide 3 develops on the surface of the butt weld zone of rod 1 and each ball 2, which extends lengthwise a distance, for example of 5 to 9 mm (See FIG. 19). Understandably, the formation of such oxide 3 causes a deterioration of the quality of the piston rod, with loss of dimensional accuracy as may be required design-wise. Accordingly, a post-welding process, such as grinding or the like, is required, all of which results in an increase in manufacturing cost.

Figure 20:
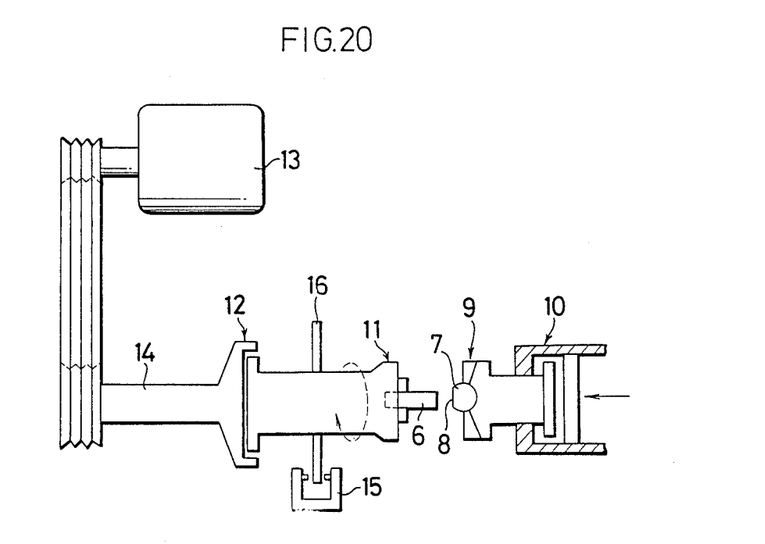
FIG. 20 is a schematic view showing a conventional machine for piston rod manufacture.

FIG. 20 illustrates a conventional apparatus for manufacturing the piston rod shown in FIG. 17, and therein reference numeral 9 denotes a holder for mechanically retaining ball 2. Holder 9 is shiftable axially by operation of a cylinder 10. A holder 11 is provided for presenting a rod 6 against a ball 7. Rod holder 11 is connected to a rotor 14 which driven by a motor 13 through a clutch 12. A brake disk 16 for engagement with a brake 15 is fixed on rod holder 11.

Figure 21:
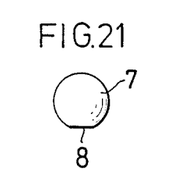
FIG. 21 is a side view of a conventional piston rod ball.
Figure 22:
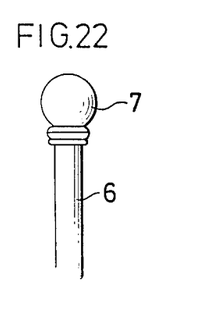
FIG. 22 is a side view of a piston rod having one ball welded thereon by friction.

The operation of the apparatus shown in FIG. 20 is as follows: ball 7 having a formed end surface 8, as shown in FIG. 21, as by cutting, is held mechanically on ball holder 9; the rod 6 is suitably held on rod holder 11 and motor 13 is then energized to rotate rod holder 11. Cylinder 10 is actuated to move ball holder 9 in order to present ball end surface 8 to the adjacent end surface of rod 6 whereby welding rod 6 to ball 7 through friction is effected, with the resulting structure illustrated in FIG. 22. However, according to such conventional method, since ball 7 is held on holder 9 through mechanical clamping, set up time is required for appropriate centering, thus decreasing working efficiency.

On the other hand, ball 7 and rod 6 must be held by a considerably strong force for friction welding, so that the clamp mechanism for ball holder 9 and rod holder is relatively complicated.

Figure 23:
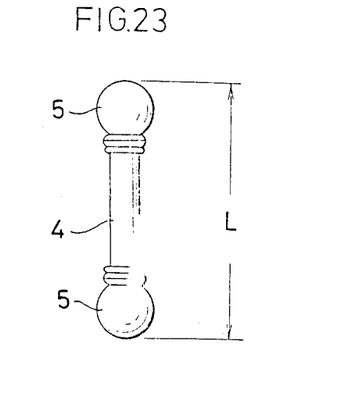
FIG. 23 is a side view of conventional piston rod.

FIG. 23 shows a piston rod for the described type which is formed through projection welding, wherein a piston rod 4, is of S20CD steel, is formed of a ball 5, for example, of SUJ2 steel, welded through projection, to each end of said rod 4 which is retained on another electrode. After bringing an end surface of rod 4 into contact with a ball 5, a carrier is developed between the opposed electrodes, thereby welding rod 4 to balls 5. However, by projection welding, the projection weld zone is hardened by intense heat, wherefore a hard, yet fragile structure is formed on the connection between the rod and each ball, with an unusual deterioration in properties. In piston rods for which a predetermined mechanical strength is required, the projection weld zone must be tempered after welding. For tempering, the welded piston rod is transferred to a heat treatment apparatus which thus necessitates a heat treatment process in addition and hence causes a diminution in production efficiency.

Furthermore, such conventional method is customarily capable of causing a sizeable discrepancy in overall length (dimension L in FIG. 23) of the piston rod as thus welded by projection, so that quality control is indeed extremely difficult.

Figure 24:
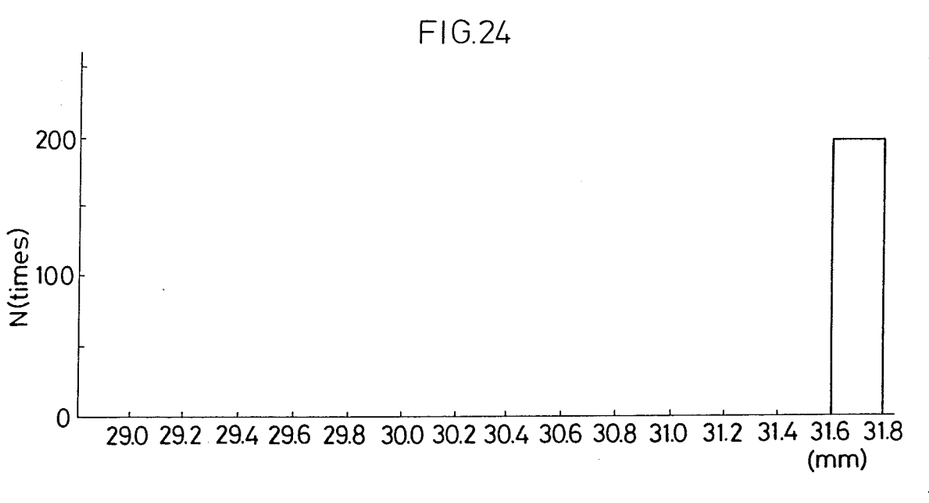
FIGS. 24 to 26, inclusive, are charts illustrating the range of distribution in dimensions of piston rods produced by current methods.
Figure 25:
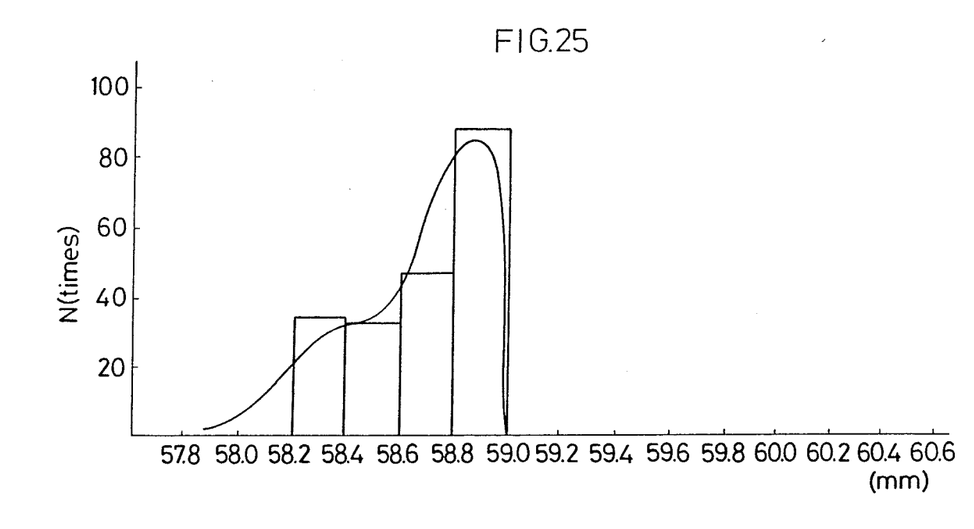
Figure 26:
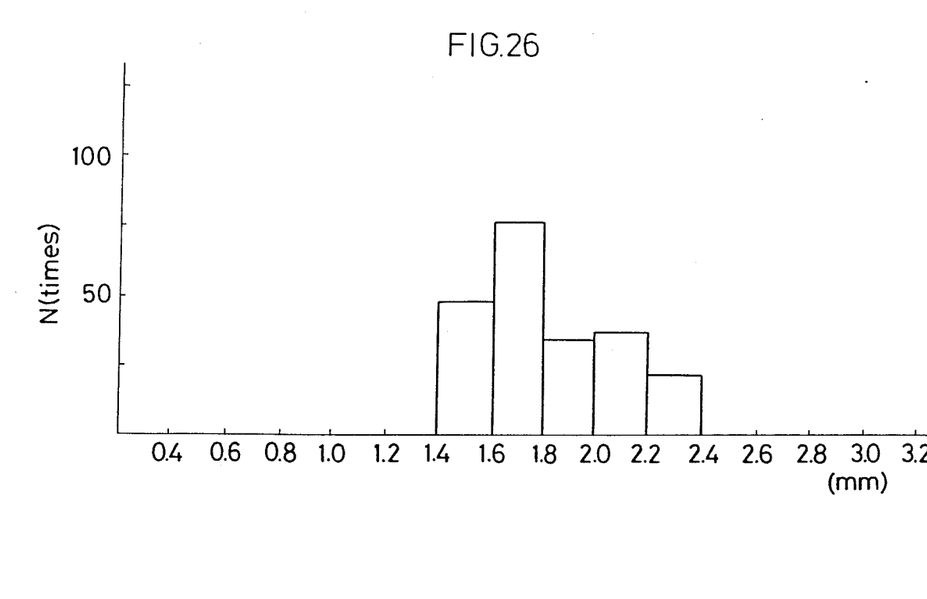

As shown in FIG. 24, in case balls 5 of a predetermined diameter are subjected to projection welding to the ends of the 200 rods 4 substantially of identified length, the overall length L of the piston rod is distributed over a substantial range, as graphically shown in FIG. 25, as with 35 pieces between 58.2 mm and 58.4 mm; 34 pieces between 58.4 mm and 58.8 mm and 87 pieces between 58.8 mm and 59.0 mm. The then length of penetration is also distributed over an extensive range, as illustrated in FIG. 26; and with 45 pieces between 1.4 mm and 1.6 mm; 75 pieces between 1.6 mm and 1.8 mm; 29 pieces between 1.8 mm and 2.0 mm; 30 pieces between 2.0 mm and 2.2 mm; 21 pieces between 2.2 mm and 2.4 mm.

Consequently, there has been hitherto the constant demand that piston rod manufacturing apparatus be provided which is capable of assuring the overall length L of a piston rod, after projection welding of high dimensional accuracy.

SUMMARY OF THE PRESENT INVENTION

It is an object of the present invention to provide a piston rod manufacturing method capable of preventing the development of a weld bead on the rod.

It is another object of the present invention to provide a piston rod manufacturing method capable of tempering the piston rod without entailing a special, independent heat treatment apparatus therefor.

It is a further object of the invention to provide a method and apparatus for manufacturing piston rods capable of facilitating the detachment of a ball from the related ball holder, as well as provide a simplified clamp mechanism.

It is a still another object of the present invention to provide a piston rod manufacturing apparatus capable of assuring of a high dimensional accuracy in the overall length of the produced piston rod.

DESCRIPTION OF THE PRACTICAL EMBODIMENTS OF THE INVENTION

Figure 1:
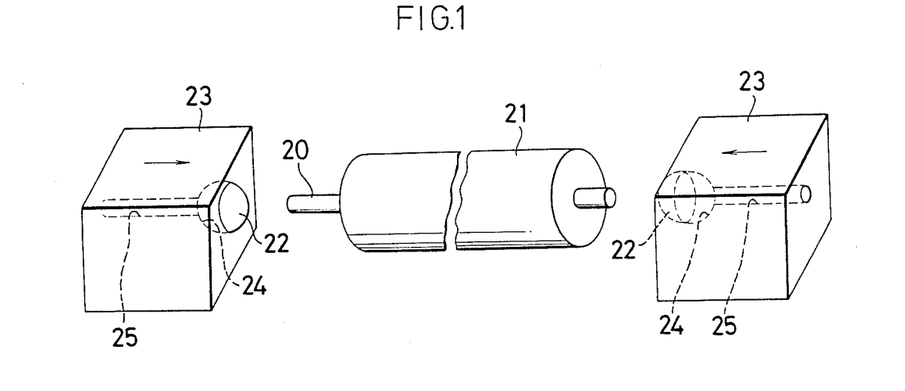
FIG. 1 is a schematic perspective view of a piston rod manufacturing apparatus constructed in accordance with and embodying the present invention as used for effecting a method according to the present invention.

Referring now by reference characters to the accompanying drawings, FIG. 1 shows a piston rod manufacturing apparatus useful for effecting a method of the present invention, wherein 20 designates a rod formed, for example, of S20CD steel. Rod 20 is supported for high speed rotation in a chuck 21. A ball holder 23 for holding a ball 22 thereon is presented at both ends of chuck 21. Provided in each ball holder 23 for confronting the proximate end of chuck 21 is a hemispherical, outwardly opening recess 24 for accepting the related ball 22 an air vent for the associated ball 22 is inwardly provided for communication with each recess 24. Each ball 22 is, for example, constructed of SUJ2 steel, and a chamfer 26 for decreasing the weld bead is formed on one end thereof. The above, described apparatus is then enclosed, for example, in an air-tight chamber (not indicated) with an atmosphere of inert gas consisting of nitrogen.

The method according to the invention will be realized as follows by means of the piston rod manufacturing apparatus constructed as described above.

Figure 2:
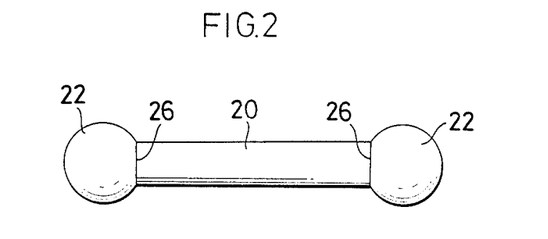
FIG. 2 is a side view showing a rod as abutting balls at the point of undertaking friction welding.

The method of manufacture achieved by the above-described apparatus is as follows:

With rod 20 being supported in chuck 21; each ball 22 being received in the respective recess 24 of the related holder 23, air is then drawn through the associated air vent 25 by a vacuum pump, whereby balls 22 are secured within recesses 24. Each ball holder 23 is then shifted in the respective directions indicated by arrows in FIG. 1, with the balls 22 being thus pushed into contact with the confronting rod 20 as shown in FIG. 2. By rotating chuck 21 at high speed, each ball 22 is welded to the proximate end of rod 20 through friction.

Figure 3:
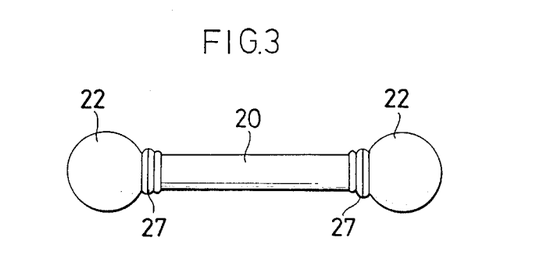
FIG. 3 is a side view of a piston rod as manufactured according to the method of the present invention.

FIG. 3 illustrates a piston rod obtained through friction welding as described, and it will be seen that a relatively long oxide is not formed on the end portion of rod 20 as hitherto expected, but rather only a relatively infinitesimal length of oxide 27 is developed.

Thus, by practice of the present invention, friction welding is carried out in an inert gas atmosphere, whereby rod 20 is not oxidized even though the same is extremely hot when welded to balls 22 through friction; and thus the oxide 27 developed thereon is consistently relatively markedly decreased. This diminution in oxide formation may eliminate a post-welding process such as grinding or the like, and thereby decrease manufacturing cost.

Additionally, since both balls 22 can be welded through friction to the opposite ends of rod 20 concurrently, manufacturing time can be sharply shortened. It is also to be noted that balls 22 can be moved to rod 20 by a force stronger than ever before at the point of friction welding, so that manufacturing time can be further shortened substantially. The provision of the chamber 26 is formed on one end of each ball 22, contributes the marked decrease in the extent of formation of oxide 27.

While the foregoing describes the apparatus as being enclosed in an airtight chamber with inert gas atmosphere, this invention is not necessarily so limited, and thus, for example, a weld zone of rod 20 and balls 22 together with adjacent portions only may be enclosed, in the inert gas atmosphere. Furthermore, although the foregoing description has been set forth as relating, for example, to the friction welding, it is to be understood that the above-described procedure is also applicable to projection welding as well.

Figure 4:
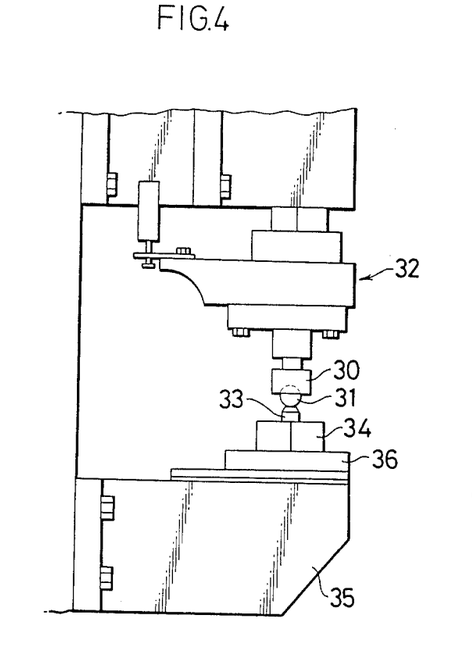
FIG. 4 is a side view of an apparatus for effecting piston rod manufacture in accordance with one embodiment of the present invention.

Referring now to FIG. 4 a piston rod manufacturing apparatus adapted for performing a method according to the present invention is shown, wherein 30 indicates a holder for a ball 31. Holder 30 is formed of a conductive metal, such as copper or the like, and is supported on the lower end of a head 32. A rod holder 34 for holding a rod 33 is disposed beneath ball holder 30, and is formed of a conductive metal, such as copper or the like; and supported on a table 36 fixed on a pedestal 35.

Ball holder 30 is provided with a hemispherical recess 37 for receiving ball 31, and is presented in confrontation to the upper side of rod holder 34. Recess 37 is so formed as to retain snugly a hemisphere of the related ball 31 when the latter is drawn thereinto, as by a vacuum suction device (not shown) communicating with recess 37 by a through hole 39 in holder 30 and a tube 38 which opens directly into the base of recess 37.

Rod holder 34, having a centrally located vertically extending hole 40 for receiving rod 33, is formed of two cooperating sections which are formed to divide hole 40 axially. An aperture of hole 40 is made smaller than the outside diameter of rod 33. The lower portion of rod holding hole 40 is enlarged as at 41, for enclosingly accepting a ball 31 therein.

A pair of through axially parallel holes 42, 43 are provided in rod holder 34 on opposite sides of rod holding hole 40, in axial normal relationship thereto. Bolts (not shown) are inserted into holes 42, 43, with nuts (not shown) being on the projecting, head-remote, externally threaded end of said bolts, thereby coupling the section of holder 34.

Figure 6:
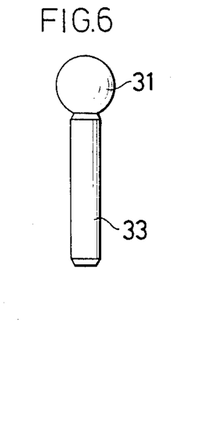
FIGS. 6 to 9, inclusive, progressively illustrate the successional stages of a piston rod wherein the rod and balls are welded pursuant to a method of the present invention.

In usage a ball 31 is inserted into recess 37 of holder 30 constituting one electrode; then vacuum suction device is actuated, causing ball 31 to be drawn securely into recess 37. Rod 33 is held in rod holder 34 constituting another electrode; it being recognized that in this case, bolts and nuts for rod holder 34 are first loosened; rod 33 is then inserted into hole 40; and then nuts are retightened on the related bolts. Ball holder 30 is then lowered by depression of head 32 and the lower end of the ball 31 is pressed onto the confronting end surface of rod 33 as shown in FIG. 6.

Figure 7:
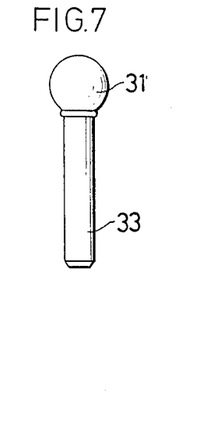

By impressing a voltage between ball holder 30 and rod holder 34 a current is caused to flow through ball 31 and rod 33 having end portions of reduced cross-sectional area, which are thus subjected to projection welding as shown in FIG. 7. Thereafter, the projection welding zone is cooled down and then a current is carried between ball holder 30 and rod holder 34 to cause a tempering of the projection welding zone.

By then reversing operation of the vacuum suction device, air is fed to recess 37 via hole 39, whereby ball 31 is released from recess 37. Ball holder 30 is then elevated by raising of head 32, bolts and nuts engaging the section of rod holder 34 are loosened, and rod 33 with a ball 31 welded thereto is extracted from rod holder 34.

Figure 8:
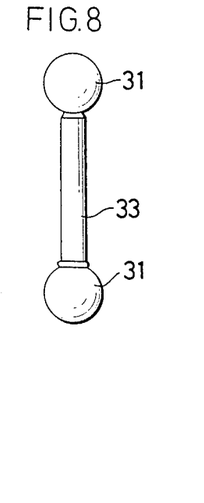
Figure 9:
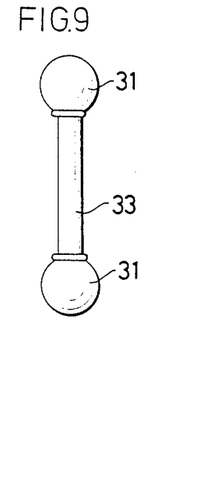

With the welded ball 31 presented downwardly, as shown in FIG. 8, and being received in lower portion 41 of hole 40, rod 33 is again inserted in hole 40 of holder 34, and a ball 31 is welded to the other or now upper end of rod 33 through projection, by the above-described operations into the form, as shown in FIG. 9.

Then, the projection welding zone is cooled down as described; a current is carried between ball holder 30 and rod holder 34; and thereby the projection welding zone is tempered.

Figure 10:
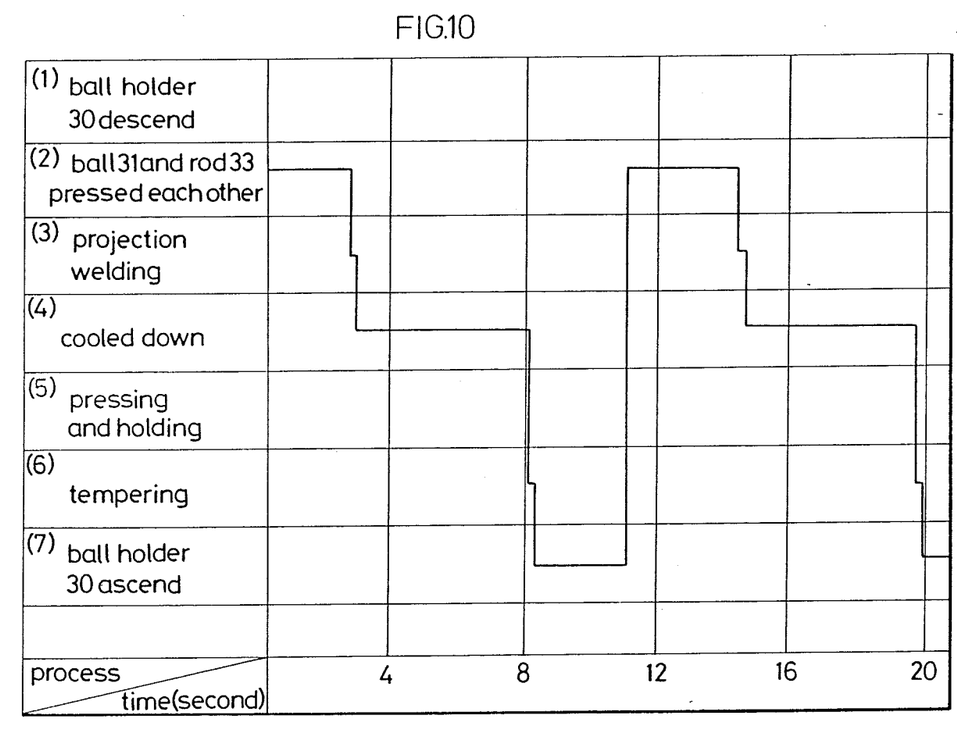
FIG. 10 is a chart showing the required time for each process step.

FIG. 10 graphically shows the relations between each process described above and the processing time therefor. It will be seen that the projection welding and the tempering can be effectuated within a manifestly limited period of time.

A carbon steel, for desired mechanical structure consisting, for example, of S20CD steel is preferable for rod 33, and a high carbon chrome bearing steel consisting, for example, for SUJ2 steel, is the material of choice for ball 31.

With ball 31 and rod 33 pressed together by a force of 260 to 300 kg, the projection welding is carried out by providing a current of 4,800 to 5,300 amperes for 0.12 to 0.14 seconds. Tempering is carried out with ball 31 and rod 33, maintained pressingly together, being cooled down for 4.8 sec. or longer after the projection welding, and then a current of 4,700 to 4,900 amperes for 0.2 to 0.24 seconds is caused to flow therethrough.

To recapitulate: ball 31 is held in ball holder 30 serving as one electrode, while rod 33 is held in the rod holder 34 serving as the other electrode; then an end surface of rod 33 is brought into contact with the presented ball 31, and then a current is carried between ball holder 30 and rod holder 34 to bring about projection welding of rod 33 and ball 31. Thereafter, the projection welding zone is cooled down, and then a current is carried between ball holder 30 and rod holder 34 to temper the projection welding zone.

Accordingly, tempering can be performed with rod 33 and ball 31 welded through projection, whereby special heat treatment apparatus is not required; with the piston rod being tempered with facility.

It is to be understood that tempering need not be carried out each time a ball 31 is projection welded to one end of the rod 33 as both ends of rod 33 may be tempered concurrently, after projection welding of a ball 31 to each such end. Furthermore, rod holder 34 may be subjected to a vice or the like, for maintaining the sections thereof tightly together, rather than utilize the bolts and associated nuts. still further as described above, ball 31 is drawn; and so held, in ball holder 30 working as one electrode through vacuuming, while rod 33 is held in rod holder 34 working as another electrode; and after bringing an end surface of rod 33 into contact with ball 31, a current is carried between ball holder 30 and rod holder 34 for welding the rod 33 to the ball 21, therefore ball 31 need not be held by a mechanical clamp device, and ball 31 can be easily removed from ball holder 30.

With projection welding an excessive force will not work on ball 31 unlike in friction welding, and thus ball 31 can be reliably held by suction.

Additionally, in the above-described apparatus, ball holder 30 and rod holder 34, each being of a conductive metal, are disposed for relative movement toward each other with recess 37 for retaining ball 31 therein by vacuum is formed on the side of ball holder confronting rod holder 34, and rod holding hole 40 for receiving and holding rod 33 therein is formed on rod holder 34, confrontingly of recess 37 wherefore ball 31 is inserted into recess 37 and is drawn thereunto, so that withdrawal of ball 31, from ball holder 30 may be easily accomplished.

Since ball 31 is retained in recess 37 by suction, ball 31 with high precision can be held in ball holder 30.

In the above-described embodiment ball holder 30 is constructed so as to be moveable vertically toward rod holder 34, however, this invention is not necessarily so limited, as rod holder 34 may be constructed for vertical movement toward ball holder 30, with the latter being stationary.

Figure 5:
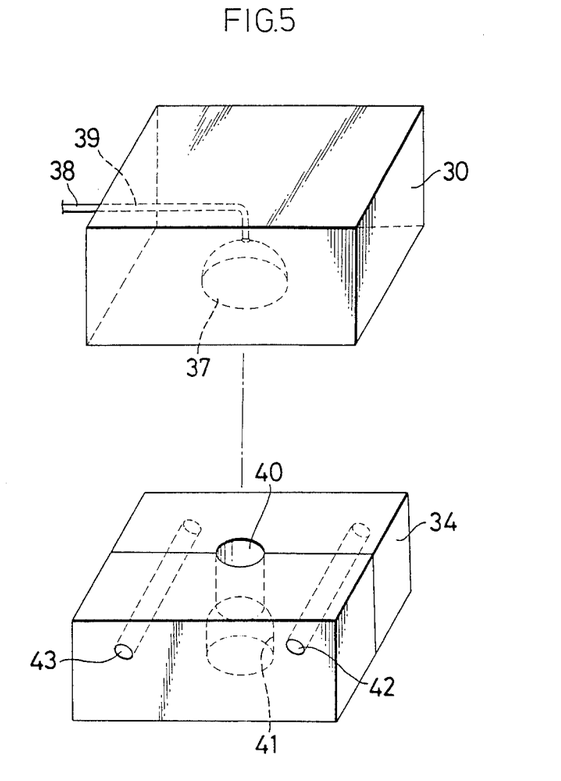
FIG. 5 is a perspective enlarged, detailed view showing both the ball holder and the rod holder of the apparatus illustrated in FIG. 4.
Figure 11:
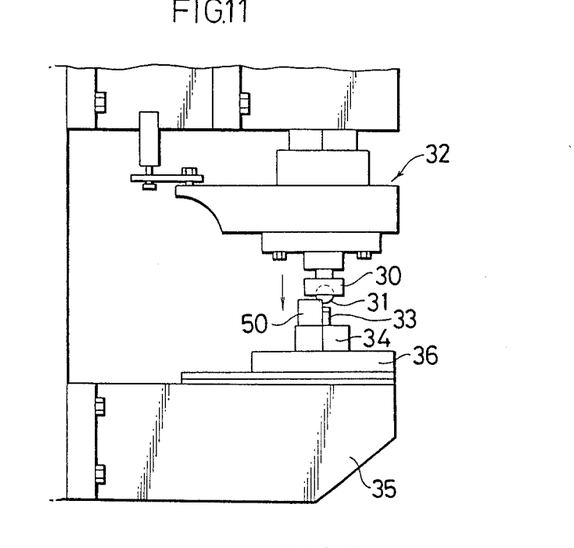
FIG. 11 is a side view of a piston rod manufacturing apparatus according to another embodiment of the present invention.
Figure 12:
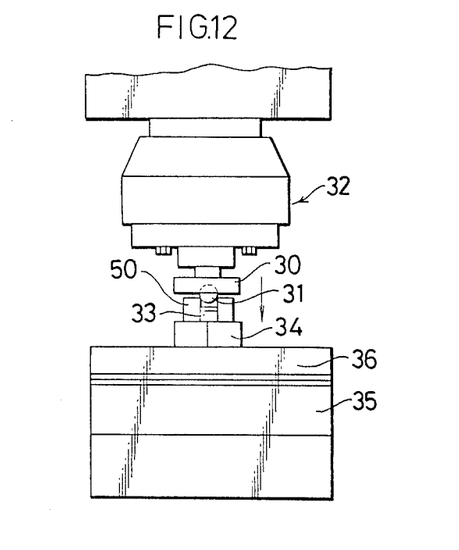
FIG. 12 is an end view showing the ball holder and the rod holder of the apparatus illustrated in FIG. 11.

Referring now to FIGS. 11 and 12, another embodiment of the piston rod manufacturing apparatus in accordance with the present invention is shown; which is of the same general construction as the apparatus illustrated in FIGS. 4 and 5 except that a stopper 50 for regulating the distance between ball holder 30 and rod holder 34 is provided. Accordingly, like reference numerals represent corresponding parts of the embodiment shown in FIGS. 4 and 5.

Figure 13:
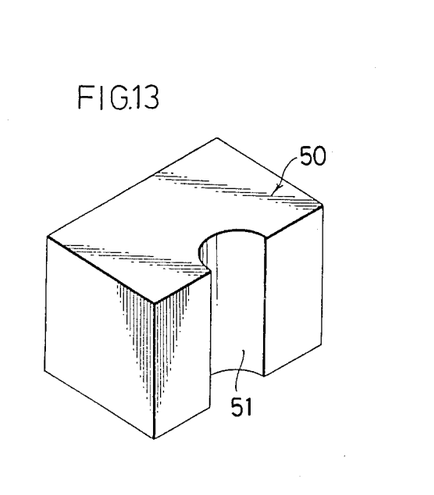
FIG. 13 is an enlarged perspective view of the stopper.

As best seen in FIG. 13, stopper 50 is formed of insulating material consisting, for example, of bakelite, and having formed on one side thereof a semicircular recess 51 of greater diameter than the outside diameter of ball 31. Stopper 50 is disposed on top of rod holder 34.

In the piston rod manufacturing apparatus constructed as above, first ball 31 is inserted in recess 37 of ball holder 30 constituting one electrode, and by actuating the vacuum suction apparatus ball 31 is securely drawn into recess 37. Rod 33 held in rod holder 34 constitutes the other electrode; with the bolts and nuts for rod holder 34 being once loosened, rod 33 then inserted in rod holding hole 40, and the nuts being then retightened and the associated bolts.

After that ball holder 30 is lowered by downward travel of head 32, and the lower end of ball 31 is brought into contact with the proximate one end surface of rod 33 as shown in FIG. 6.

By then impressing a voltage between ball holder 30 and rod holder 34, a current flows through ball 31 and rod 33 to cause projection welding of ball 31 and rod 33 as shown in FIG. 7. Ball holder 30 is then shifted further downwardly a requisite distance to cause the under surface of ball holder 30 to be brought into contact with the upper surface stopper 50, whereby ball holder 30 comes to a stop at such position. In such state, a predetermined pressure is applied on ball 31.

By reversing operation of the vacuum suction apparatus, the air is fed to recess 37 by way of through hole 39, and thus the ball 31 is released from recess 37.

Ball holder 30 is shifted upwardly by movement of head 32, and after loosening the bolts and nuts for rod holder 34, rod 33 with ball 31 welded thereto is extracted from rod holder 34.

After that, as shown in FIG. 8, with the now welded ball 31 presented downwardly rod 33 is again inserted in hole 40 of rod holder 34, and the other ball 31 is welded to other end of rod 33, as shown in FIG. 9, according to a method substantially similar to the foregoing.

Then, in the above-described apparatus, ball holder 30 and rod holder 34, each formed of a conductive metal, are moveable toward each other; with recess 37 for drawing in and holding ball 31 therein being provided on ball holder 30 confrontingly toward the upper surface of rod holder 34; with hole 40 for accepting and holding rod 33 therein being formed on holder 34 with the upper end of hole directed toward recess 37; and further stopper 50, constructed of a suitable insulating material, being provided for regulating the distance between both holders as they approach each other, is disposed between both holders as they approach each other, is disposed between ball holder 30 and rod holder 34. Wherefore a gap or spacing between ball holder 30 and rod holder 34 at the time of projection welding is assured by stopper 50 with a high degree of reliable dimensional accuracy.

Consequently, the integrity of the overall length of the piston rod obtained through projection welding can be achieved.

Figure 14:
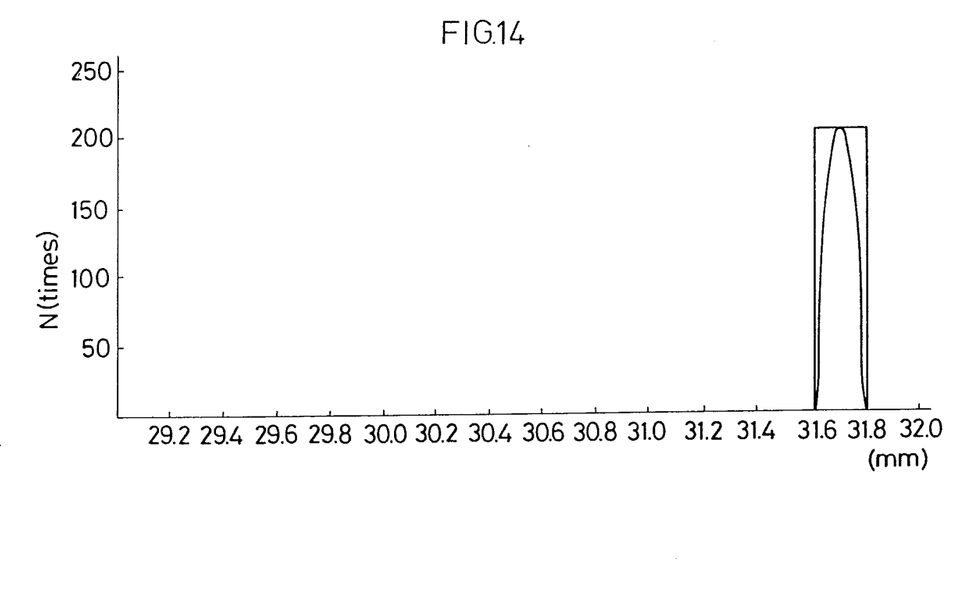
FIGS. 14 to 16 inclusive are charts showing the range of distribution of piston rods constructed pursuant to the present invention.
Figure 15:
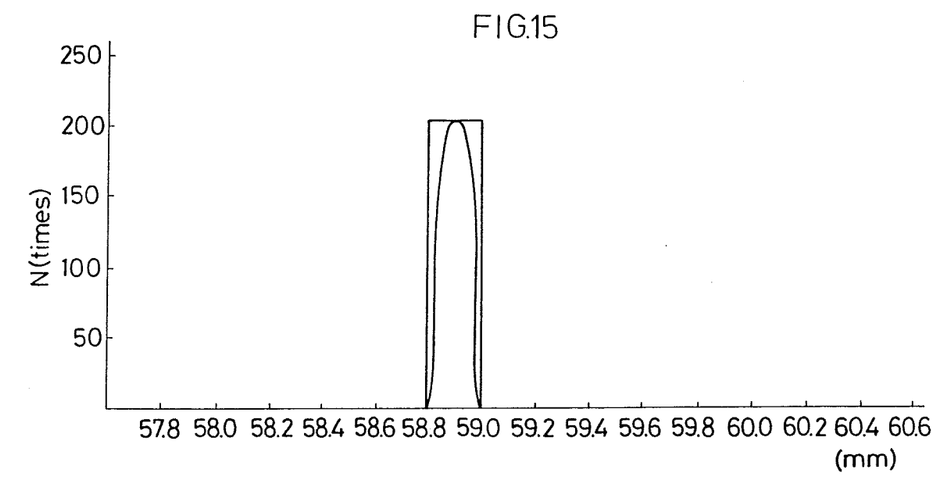
Figure 16:
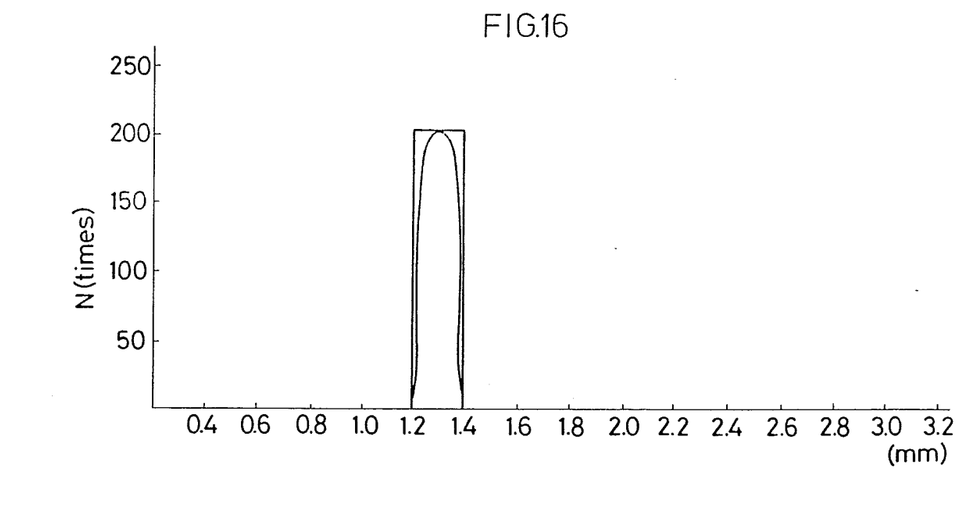

Thus, in piston rod manufacturing apparatus as described, with balls 31 of a diameter being welded, through projection, to the ends of rods 33 as of a length as shown in FIG. 14; the overall length of the manufactured piston rod can be consistent with a high degree of dimensional accuracy as shown in FIG. 15; and the length of penetration in such case can also be controlled with an equally high degree of dimensional accuracy as shown in FIG. 16.

In the immediately described embodiment, the ball holder 30 is constructed and designed for reciprocal vertical travel, however, the invention is not necessarily so limited in that rod holder 34 may be constructed, for vertical moveability.

What is claimed:

1. A method for producing a piston rod wherein a ball is fixed on each end surface of a rod through projection welding comprising providing a first electrode, placing a ball in said first electrode, providing a second electrode, placing said rod in said second electrode, relatively moving said first and second electrodes to bring a ball into contact with one end of said rod, wherein said end has a reduced cross-sectional area, then providing a first electric current to flow between said first and second electrodes whereby the ball and the rod are projection welded in the zone of mutual contact, and then extracting said now welded ball and rod from the respective electrodes.

2. A method as defined in claim 1 wherein vacuum forming means are provided with said first electrode whereby the ball is securely held in said first electrode upon activation of said vacuum forming means.

3. A method as defined in claim 1 wherein subsequent to the flow of said first electric current, the projection welded zone is cooled, and then providing a second electric current to flow between said first and second electrodes within the projection weld zone for tempering thereof.

4. A method for producing a piston rod as defined in claim 1 wherein the projection welding is effected in an inert gas atmosphere.

5. A method for producing a piston rod as defined in claim 3 wherein said first and second electric currents flow in an inert gas atmosphere.

6. A method for producing a piston rod as defined in claim 3 wherein the ball and the rod are maintained under pressure when in mutual contact.

7. A method for producing a piston rod as defined in claim 6 wherein the pressure is within the range of 260 to 300 kg.

8. A method for producing a piston rod as defined in claim 3 wherein the first electric current has an amperage in the range of about 4,800 to 5,300 and is maintained for a period of about 0.12 to 0.14 seconds.

9. A method for producing a piston rod as defined in claim 8 wherein the second electric current has an amperage in the range of about 7,700 to 4,900 and is maintained for a period of about 0.2 to 0.24 seconds.

10. A method for producing a piston rod as defined in claim 9 wherein the projection welded zone is cooled for a period of about at least 4.8 seconds.

11. A piston rod manufacturing apparatus comprising a ball holder having a recess for receiving a ball, a rod holder for receiving a rod, said rod having an end portion with a reduced cross-sectional area, for presentation in opposed relationship to the ball, means for relatively moving said ball holder and said rod holder toward each other for bringing the respective ball and rod into mutual contact, means for maintaining said ball and rod in such contact for a predetermined time interval, said ball holder and rod holder each being constructed of electrically conductive metal.

12. A piston rod manufacturing apparatus as defined in claim 11 and further characterized by vacuum-forming means being connected to said ball holder recess for reliable retention of ball therein upon activation.

13. A piston rod manufacturing apparatus as defined in claim 12 and further characterized by there being a source of electrical energy connected to said apparatus, and means for effecting electrical current flow between said ball holder and said rod holder, respectively, when the engaged ball and rod are in mutual contact.

14. A piston rod manufacturing apparatus as defined in claim 11 wherein the conductive metal is from the class consisting of copper and copper alloy.

15. A piston rod manufacturing apparatus as defined in claim 13 wherein means are provided between said ball holder and said rod holder for controlling the relative movement of the same toward each other.

16. A piston rod manufacturing apparatus as defined in claim 15 wherein said means provided between said ball holder and rod holder is a discrete body fabricated of insulating material.

17. A piston rod manufacturing apparatus as defined in claim 13 wherein means are provided for cooling the contacting ball and rod after flow of electrical energy therethrough.

18. A piston rod manufacturing apparatus as defined in claim 17 wherein means are provided for effecting discontinuance of electrical current flow prior to operation of means for reinstituting electrical current flow after operation of means of cooling.

19. A piston rod manufacturing apparatus as defined in claim 18 wherein means are provided for controlling the amperage and duration of the electrical current flowing before and after the cooling period.

20. A piston rod manufacturing apparatus as defined in claim 19 wherein means are provided for controlling the duration of the cooling period.

* * * * *